United States Patent Office 3,736,307
Patented May 29, 1973

3,736,307
ETHYLENE-PROPYLENE COPOLYMER PRODUCTION WITH TRIPHENYLPHOSPHITE AS CATALYST ADJUVANT
Robert J. Perry, Bartlesville, Okla., assignor to Phillips Petroleum Company
No Drawing. Filed Oct. 26, 1970, Ser. No. 84,146
Int. Cl. C08f 15/04
U.S. Cl. 260—88.2 R    5 Claims

ABSTRACT OF THE DISCLOSURE

Ethylene-propylene copolymer is produced in a catalyst system comprising diethylaluminum chloride and titanium trichloride and as an adjuvant, triphenylphosphite. At a level of about 4–10 mol percent triphenylphosphite based on the mols of titanium trichloride, polymer is produced which is more easily handled in conventional finishing equipment and which can be fabricated into film which is virtually free of fish eyes and other imperfections.

BACKGROUND OF THE INVENTION

This invention relates to adjuvants for organometal catalyst systems in the produtcion of ethylene-propylene copolymer.

It is known to use a variety of compounds including triphenyphosphite as adjuvants as is broadly disclosed in Stedfeder et al., U.S. 3,502,634. As the use of such adjuvants applies to the production of propylene polymers, it has been found that the soluble polymer content of propylene homopolymer is greatly reduced with a resulting improvement in the processability and physical properties of the resultant polymer.

With ethylene-propylene copolymers, however, the effect is less pronounced with soluble polymer decreasing very gradually in a substantially linear relationship as the amount of adjuvant is inceased. The processability of ethylene-propylene copolymers made using such adjuvants at levels below 4 mol percent based on the mols of titanium trichloride correlates with the solubles data showing only a modest, essentially linear, improvement in processability. Based on this information, it would appear that such adjuvants as applied to ethylene-propylene copolymer systems, while effecting some improvement in processability, are not sufficiently effective to justify their use on a commercial scale.

SUMMARY OF THE INVENTION

It is an object of this invention to provide an improved catalyst system for ethylene-propylene copolymer production; and It is a further object of this invention to produce ethylene-propylene copolymer at commercially feasible rates.

In accordance with this invention, it has been found that one adjuvant, triphenylphosphite, when used in a concentration of 4–10 mol percent based on the mols of titanium trichloride, effects a drastic improvement in the processability of the resulting polymer.

DESCRIPTION OF THE PREFERRED EMBODIMENTS

The instant invention is applicable to the production of copolymers of propylene containing from 2 to 5, preferably 2.5 to 3.7, weight percent ethylene based on the weight of total polymer.

The catalyst system to which the triphenylphosphite is added comprises about 1½ to about 3 parts by weight diethylaluminum chloride per part by weight of titanium trichloride. The polymerizations are carried out at a temperature of 115–145, preferably 130–135° F. The pressure is generally sufficient to keep the propylene in a liquid phase.

The reaction mixture can contain conventional additives such as catalyst poison scavengers, antioxidants, diluents for the catalyst components and the like. In addition, a small amount of hydrogen will generally be employed to control the molecular weight.

Suitable equipment for carrying out the polymerization in accordance with the invention is disclosed in Houser et al., U.S. 3,203,943, the disclosure of which is hereby incorporated by reference.

The triphenylphosphite is added in an amount within the range of about 4 to about 10 mole percent based on the moles of titanium trichloride, preferably from 4 to 8 mole percent.

EXAMPLE I

Propylene was copolymerized with ethylene using 3 parts by weight diethyaluminum chloride to 1 part by weight titanium trichloride in equipment such as is disclosed in said Houser et al. patent. Triphenylphosphite was added in some of the runs. The ethylene is shown in weight percent based on the weight of the total polymer. The triphenylphosphite is shown in mol percent based on the mols of titanium trichloride. The solubles are shown in weight percent of material soluble in xylene based on the weight of the total polymer. The rate is given in pounds of polymer per hour and reflects the ease with which the solid polymer can be handled by the finishing equipment such as the wash tank, the flash tank, and the extruder, since these are the limiting factors in the operation. The data for solubles and rate are taken from a plot of actual data and in most instances represent an average of multiple runs for each level of triphenylphosphite. The results were as follows:

EFFECT OF ADJUVANT ON SOLUBLES

| Ethylene, weight percent | Triphenylphosphite, mole percent | Solubles, weight percent |
|---|---|---|
| 2.5 | 0 | 6.3 |
| 2.5 | 4 | 5.1 |
| 2.5 | 8 | 3.9 |
| 3.7 | 0 | 9.6 |
| 3.7 | 4 | 7.5 |
| 3.7 | 8 | 5.4 |

These data reveal that an increase in triphenylphosphite concentration results in a modest decrease in the solubles content which decrease bears a linear relationship to the amount of triphenylphosphite.

EFFECT OF ADJUVANT ON PRODUCTION RATE

| Ethylene, weight percent | Triphenylphosphite, mole percent | Rate,[a] lbs./hr. |
|---|---|---|
| 2.5 | 0 | 1,910 |
| 2.5 | 4 | 1,990 |
| 2.5 | 8 | 2,310 |
| 3.7 | 0 | 1,420 |
| 3.7 | 4 | 1,520 |
| 3.7 | 8 | 2,280 |

[a] Conditions such as temperature were varied in each run to optimum levels to give the highest rate possible.

These data reveal surprisingly that the production rate is greatly increased over the range of 4–8 percent triphenylphosphite. For instance, at 3.7% ethylene the solubles were reduced on going from 0 to 4 percent triphenylphosphite, from 9.6 to 7.5, or 2.1 percentage points. The productivity rate was increased from 1420 to 1520, or 100 lbs./hr. When going from 4 to 8 percent triphenylphosphite, the solubles showed an additional decrease of 2.1 percentage points which is the same as was achieved in going from 0 to 4 percent. However, the increase in production rate was 7.6 times that of going from 0 to 4 percent.

The polymer thus produced in accordance with the invention was made into film having good clarity and essentially no gel spots.

While this invention has been described in detail for the purpose of illustration, it is not to be construed as limiting thereby but intended to cover all changes and modifications within the spirit and scope thereof.

I claim:

1. A process for producing a copolymer of propylene and 2–5 weight percent ethylene based on the weight of the total polymer comprising: contacting propylene and ethylene monomers in the presence of a catalyst which forms on mixing components comprising diethylaluminum chloride, titanium trichloride, and 4–10 mol percent triphenylphosphite based on the mols of said titanium trichloride, at a temperature of 115 to 145° F.

2. A method according to claim 1 wherein said triphenylphosphite is present in an amount within the range of 4–8 mol percent.

3. A method according to claim 2 wherein said ethylene is present in said polymer in an amount within the range of 2.5 to 3.7 weight percent.

4. A method according to claim 2 wherein said diethylaluminum chloride is present in an amount in the range of 1.5–3 weight parts per weight part of said titanium trichloride.

5. A method according to claim 2 wherein said temperature is within the range of 130–135° F.

References Cited

UNITED STATES PATENTS

| | | | |
|---|---|---|---|
| 3,475,394 | 10/1969 | Matsumura | 260—88.2 |
| 3,502,634 | 3/1970 | Stedefeder | 260—93.7 |
| 3,040,014 | 6/1962 | Lovett | 260—93.7 |
| 3,414,554 | 12/1968 | Kahle | 260—93.7 |
| 3,558,586 | 1/1971 | Fodor | 260—93.7 |

JOSEPH L. SCHOFER, Primary Examiner

R. S. BENJAMIN, Assistant Examiner

U.S. Cl. X.R.

260—94.9 CB; 252—429 B